United States Patent
Herrera

(10) Patent No.: US 6,964,091 B1
(45) Date of Patent: Nov. 15, 2005

(54) WIPER BLADE CLAW WITH CRIMPING DESIGN

(75) Inventor: Daniel Herrera, Juarez (MX)

(73) Assignee: Valeo Electrical Systems, Inc., Auburn Hills, MI (US)

( * ) Notice: Subject to any disclaimer, the term of this patent is extended or adjusted under 35 U.S.C. 154(b) by 219 days.

(21) Appl. No.: 10/210,749

(22) Filed: Jul. 31, 2002

(51) Int. Cl.⁷ .......................... B21D 39/00; B23P 11/00; A47L 1/00; B60S 1/02
(52) U.S. Cl. ............................ 29/505; 29/513; 29/514; 15/250.44; 15/250.361
(58) Field of Search ...................... 15/250.44, 250.451, 15/250.452, 250.454, 250.361, 250.41, 250.48; 29/505, 509, 513, 514, 521

(56) References Cited

U.S. PATENT DOCUMENTS

| | | | |
|---|---|---|---|
| 2,266,394 A | * | 12/1941 | Horton .................. 15/250.32 |
| 3,659,310 A | * | 5/1972 | Rosen .................. 15/250.452 |
| 4,309,790 A | | 1/1982 | Bauer et al. |
| 4,487,053 A | | 12/1984 | Bauer et al. |
| 5,023,972 A | | 6/1991 | Bauer et al. |
| 5,231,730 A | | 8/1993 | Schmid et al. |
| 5,271,122 A | | 12/1993 | Roth et al. |
| 5,339,510 A | | 8/1994 | Roth et al. |
| 5,926,907 A | | 7/1999 | Schmid et al. |
| 6,112,365 A | * | 9/2000 | Ullrich et al. ......... 15/250.454 |
| 6,253,412 B1 | | 7/2001 | Herrmann et al. |

\* cited by examiner

Primary Examiner—John Kim
Assistant Examiner—Laura C Cole
(74) Attorney, Agent, or Firm—Young & Basile, P.C.

(57) ABSTRACT

A method of manufacturing a wiper blade for a windshield wiper system of motor vehicles with a yoke system for guiding an elongate wiper strip including a lip mounted on a carrier via a web is disclosed. The wiper blade and method of manufacturing the wiper blade includes the wiper strip installed with respect to the yoke system with the carrier extending through at least one claw of the yoke system. Each claw has opposing bendable sidewalls defining a generally U-shaped channel therebetween and located initially in an opened position with respect to one another during installation of the wiper strip. The opposing sidewalls of at least one claw are bent inwardly in two directions toward the longitudinal axis of the elongate wiper strip to a closed position, where one of the two directions of bending movement is at an angle other than perpendicular with respect to the longitudinal axis of the elongate wiper strip and the other of the two directions is toward a base wall extending between the opposing sidewalls of the U-shaped channel in the yoke system.

21 Claims, 2 Drawing Sheets

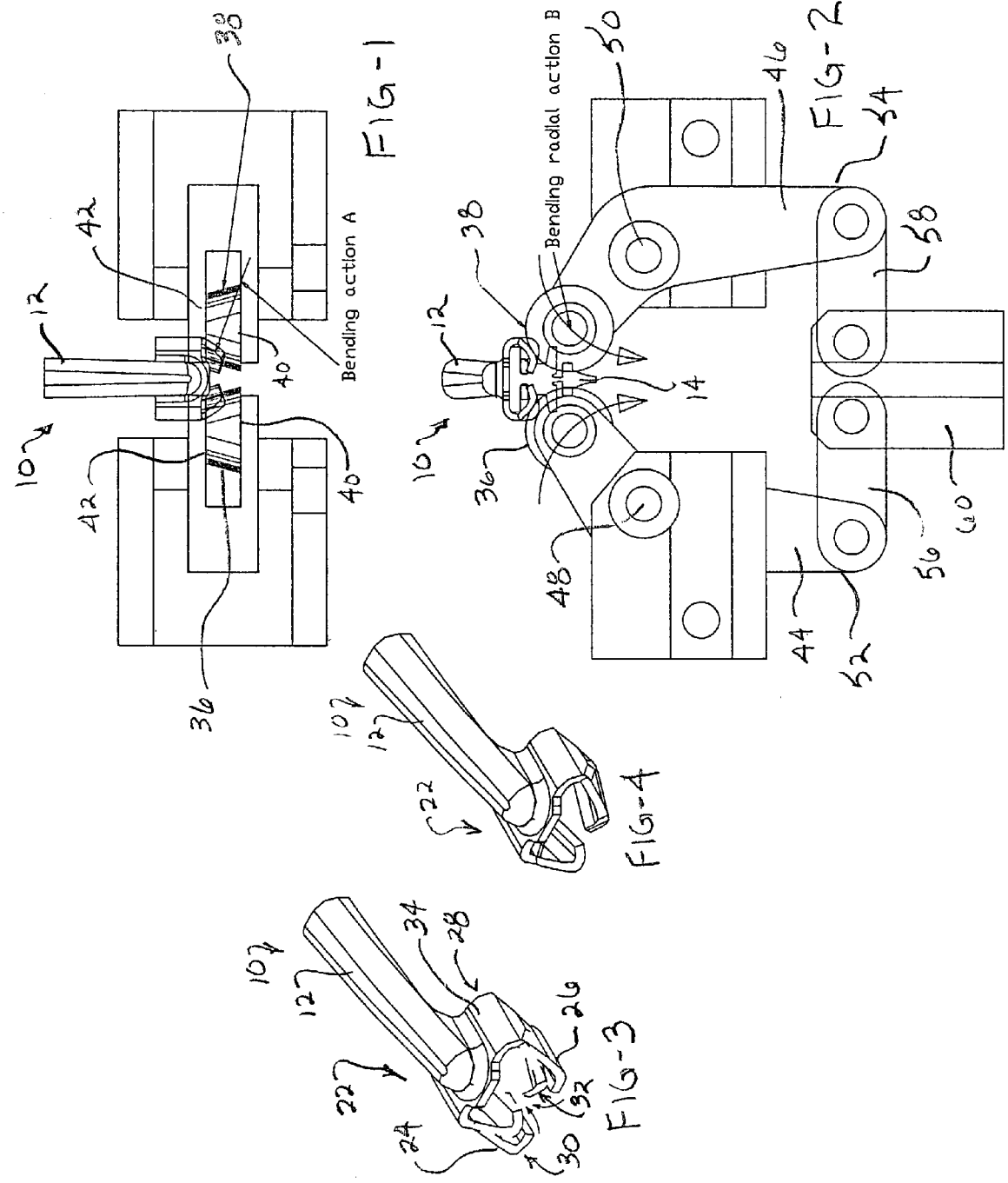

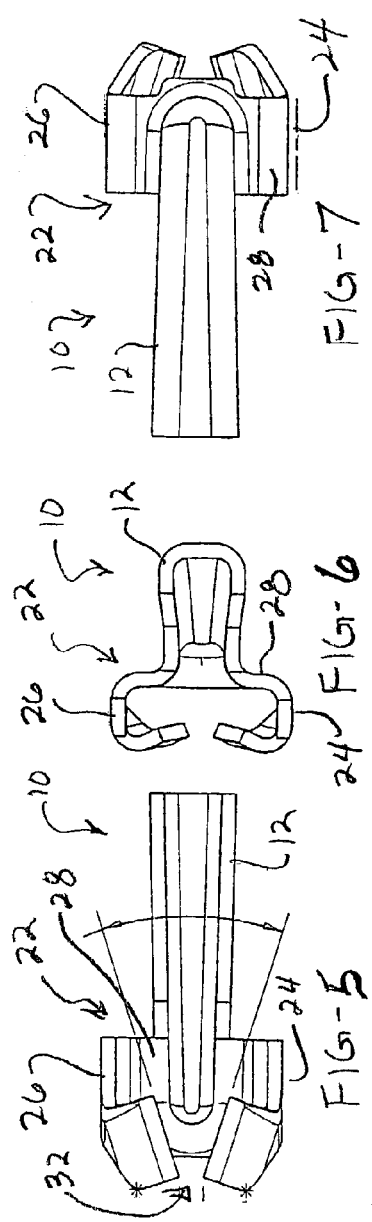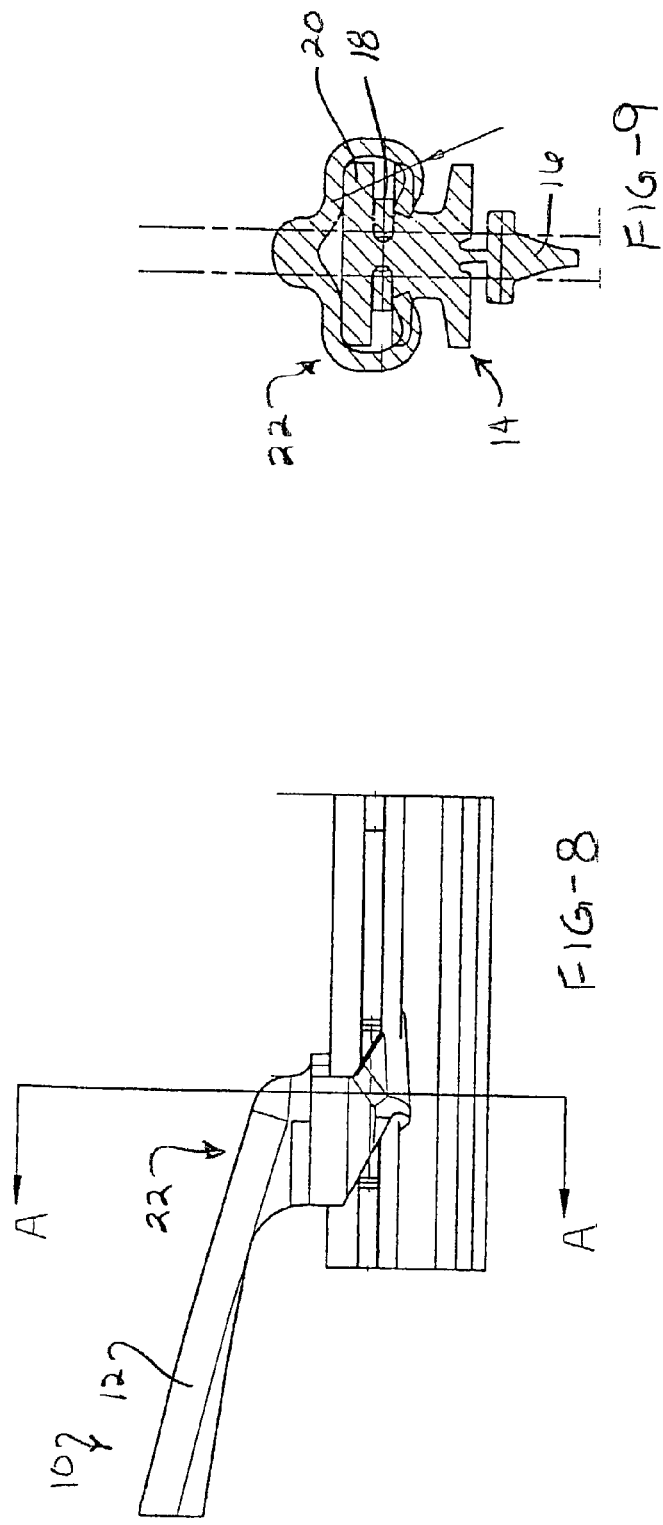

WIPER BLADE CLAW WITH CRIMPING DESIGN

FIELD OF THE INVENTION

The present invention relates to a wiper blade for a wiper system.

BACKGROUND OF THE INVENTION

A wiper blade associated with modern motor vehicles typically includes a yoke system with a primary yoke and several clawed yokes, a rubber wiper strip, as well as reinforcing or resilient rails for distributing pressure exerted on the wiper strip by the claws of the yoke system over the whole wiper strip as evenly as possible. A typical wiper strip includes a carrier having an elongated groove extending along each side for receiving the reinforcing or resilient rails. The carrier of the wiper strip can also include another elongated groove or an elongated channel extending along each side for receiving the claws of the yoke system. Wiper blades of this construction are well adapted for cleaning curved windshields of motor vehicles since the yoke system and the claws in the elongated channel allow limited longitudinal movement so that the lip can be adapted to the curvature of the windshield or windscreen to be cleaned. In order to permit the claws to move in the elongate channel, relative movement is also permitted between the reinforcing rail and the wiper strip. Typically, the wiper strip is captured with respect to the yoke system by releasable interlocking members operably engagable with at least one of the outermost claws in the yoke system. The provision of releasable lock members associated with the wiper strip greatly increases the complexity of the structure and the overall cost of the wiper blade.

SUMMARY OF THE INVENTION

It would be desirable in the present invention to provide a cost effective method of securing a wiper strip with respect to a yoke system. It would be desirable in the present invention to reduce the cost and complexity of the connection between the wiper strip and yoke system. It would be desirable in the present invention to provide a wiper strip permanently connected to a yoke system of a replaceable wiper blade.

A method according to the present invention manufactures a wiper blade for a windshield wiper system of motor vehicles with a yoke system for guiding an elongate wiper strip including a lip mounted on a carrier via a web. The method according to the present invention includes the steps of installing the wiper strip with respect to the yoke system with the carrier extending through at least one claw of the yoke system, where each claw has opposing bendable sidewalls defining a generally U-shaped channel therebetween and where initially each claw is in an opened position with respect to one another during installation of the wiper strip. The method further includes the step of bending the opposing sidewalls of at least one claw inwardly in two directions toward a longitudinal axis of the elongate wiper strip to a closed position, where one of the two directions of bending movement is at an angle other than perpendicular with respect to the longitudinal axis of the elongate wiper strip and the other of the two directions is toward a base wall extending between the opposing sidewalls of the U-shaped channel in the yoke system.

In the preferred method according to the present invention, the opposing sidewalls of at least one claw of the yoke system are simultaneously bent with a pair of angularly reciprocal tapered rollers, where one end of each roller has an enlarged diameter and an opposite end of each roller has a reduced diameter. The one claw of the yoke system is oriented to be engagable with the pair of tapered rollers such that the reduced diameter of each roller is closer to a central portion of the yoke system than the enlarged diameter of each roller. The opposing sidewalls of the one claw are crimped at an oblique angle with a dual axis force to deform the sidewalls in a direction other than perpendicular to the longitudinal axis of the elongate wiper strip.

A wiper blade according to the present invention, such as a wiper blade manufactured according to the method of the present invention, is adapted for use in windshield wiper systems of motor vehicles with a yoke system for guiding a wiper strip including a lip mounted on a body via web. The wiper blade includes the wiper strip installed with respect to the yoke system with the carrier extending through at least one claw of the yoke system, where each claw has opposing bendable sidewalls defining a generally U-shaped channel therebetween and where initially each claw is in an opened position with respect to one another during installation of the wiper strip. The opposing sidewalls of at least one claw are bent inwardly in two directions toward a longitudinal axis of the elongate wiper strip to a closed position, where one of the two directions of bending movement is at an angle other than perpendicular with respect to the longitudinal axis of the elongate wiper strip and the other of the two directions is toward a base wall extending between the opposing sidewalls of the U-shaped channel in the yoke system.

In the preferred configuration of the wiper blade according to the present invention, the opposing sidewalls of the one claw of the yoke system is bent inwardly at an oblique angle with respect to the longitudinal axis of the elongate wiper strip. The opposing sidewalls of at least one claw according to the present invention are obliquely crimped with a dual axis force to deform the sidewalls in a direction other than perpendicular to the longitudinal axis of the elongate wiper strip.

Other applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein:

FIG. 1 is a plan view of an apparatus for practicing a method for manufacturing a wiper blade according to the present invention;

FIG. 2 is a side elevational view of the apparatus illustrated in FIG. 1;

FIG. 3 is a perspective view of one claw associated with a yoke system of the wiper blade according to the present invention illustrating the opened position with the rubber and carrier spline not shown and bending movement toward the closed position in phantom;

FIG. 4 is a perspective view of the one claw of the yoke system of the wiper blade illustrated in FIG. 3 with opposing sidewalls defining a generally U-shaped channel bent to a closed position with the rubber and carrier spline not shown;

FIG. 5 is a bottom view of the claw illustrated in FIG. 3 with the rubber and spline not shown;

FIG. 6 is a cross-sectional view taken as shown in FIG. 5;

FIG. 7 is a plan view of the claw illustrated in FIGS. 4–6 with the rubber and spline not shown;

FIG. 8 is a side elevational view of one claw associated with a yoke system of the wiper blade according to the present invention with the rubber and carrier spline shown passing through the claw; and FIG. 9 is a cross-sectional view taken as shown in FIG. 8.

DETAILED DESCRIPTION OF THE PREFERRED EMBODIMENT

Referring now to FIGS. 1–4, a method of manufacturing a wiper blade 10 for a windshield wiper system of a motor vehicle with a yoke system 12 for guiding an elongate wiper strip 14 including a lip 16 mounted on a carrier spline 18 via a web 20 is illustrated. The method includes the step of installing or inserting the wiper strip 14 with respect to the yoke system 12 with the carrier spline 18 extending through at least one claw 22 of the yoke system 12. Each claw 22 has opposing bendable sidewalls 24, 26 defining a generally U-shaped channel 28 extending therebetween for receiving the carrier portion of the wiper strip 14. The opposing bendable sidewall 24, 26 are initially in an opened position 30, as best seen in FIG. 3, with respect to one another during installation of the wiper strip 14. The method according to the present invention includes the step of bending the opposing sidewalls 24, 26 of at least one claw 22 inwardly in two directions toward a longitudinal axis of the elongate wiper strip 14 to a closed position 32, as best seen in FIGS. 4–7. One of the two directions of bending movement is at an angle other than perpendicular with respect to the longitudinal axis of the elongate wiper strip 14 and the other of the two directions is toward a base wall 34 extending between the opposing sidewalls 24, 26 of the U-shaped channel 28 in the yoke system 12.

If additional retaining force is required to maintain the wiper strip 14 with respect to the yoke system 12, the method of manufacturing according to the present invention can include bending the opposing sidewalls 24, 26 of a plurality of claws 22 associated with the yoke system 12 inwardly at an oblique angle with respect to the longitudinal axis of the elongate wiper strip. The plurality of claws 22 to be bent in this particular configuration preferably are adjacent to one another. This configuration allows the remaining length of the wiper strip 14 to expand and contract as required during oscillatory rotary movement of the wiper blade 20 across the windshield to be cleaned. The method of manufacturing according to the present invention can also include bending the opposing sidewalls 24, 26 of at least two claws 22 in different oblique directions with respect to the longitudinal axis of the elongate wiper strip 14 to lock the wiper strip 14 against longitudinal movement with respect to the yoke system 12 where additional retaining force is required for extremely long wiper strips.

The bending step according to the present invention preferably includes simultaneously bending the opposing sidewalls 24, 26 of at least one claw 22 of the yoke system 12 with a pair of angularly reciprocal tapered rollers 36, 38, where one end 40 of each roller 36, 38 has an enlarged diameter and an opposite end 42 of each roller 36, 38 has a reduced diameter. In the preferred method according to the present invention, the bending step includes orienting at least one claw 22 of the yoke system 12 to be engagable with the pair of tapered rollers 36, 38 such that the reduced diameter end 42 of each roller 36, 38 is closer to a central portion of the yoke system 12 than the enlarged diameter end 40 of each roller 36, 38. However, it should be recognized that the present invention can also be practiced by orienting at least claw 22 of the yoke system 12 to be engagable with the pair of tapered rollers 36, 38 such that the enlarged diameter end 40 of each roller 36, 38 is closer to a central portion of the yoke system 12 then the reduced diameter end 42 of each roller 36, 38.

In the preferred configuration, the bending step further includes the step of obliquely crimping the opposing sidewalls 24, 26 of at least one claw 22 with a dual axis force to deform the sidewalls in a direction other than perpendicular to the longitudinal axis of the elongate wiper strip 14. This crimping action can be provided by the apparatus illustrated in FIGS. 1 and 2 where the rollers 36, 38 are rotatably engaged on outer ends of crank arms 44, 46 respectively. The crank arms are pivotable about pivot pins or shafts 48, 50 respectively. Opposite ends 52, 54 of the crank arms 44, 46 respectively are connected by links 56, 58 to a reciprocal actuator 60. Movement of the reciprocal actuator 60 drives the crank arms 44, 46 in pivotal motion about the pivot pins 48, 50 moving the roller 36, 38 into operable engagement with the opposing sidewalls 24, 26 of the claw 22 to be bent into operable retaining engagement with the wiper strip 14 to be held with respect to the yoke system 12.

A wiper blade 10 according to the present invention, such as a wiper blade 10 manufactured according to the method of the present invention, can be used for windshield wiper systems of motor vehicles with a yoke system 12 for guiding a wiper strip 14 including a lip 16 mounted on a carrier 18 via a web 20. The wiper blade 10 according to the present invention includes the wiper strip 14 installed with respect to the yoke system 12 with the carrier spline 18 extending through at least one claw 22 of the yoke system 12. Each claw 22 has opposing bendable sidewalls 24, 26 defining a generally U-shaped channel 28 extending therebetween and located initially in an opened position 30 with respect to one another during installation of the wiper strip 14. The opposing sidewalls 24, 26 of at least one claw 22 are bent inwardly in two directions toward a longitudinal axis of the elongate wiper strip 14 to a closed position 32, where one of the two directions of bending movement is at an angle other than perpendicular with respect to the longitudinal axis of the elongate wiper strip 14 and the other of the two directions is toward a base wall 34 extending between the opposing sidewalls 24, 26 of the U-shaped channel 28 and the yoke system 12.

If additional retaining force is required for extremely large wiper strips 14 to be associated with a yoke system 12 of a wiper blade 10 according to the present invention, the opposing sidewalls 24, 26 of a plurality of claws 22 associated with the yoke system 12 can be bent inwardly at an oblique angle with respect to the longitudinal axis of the elongate wiper strip 14. The opposing sidewalls 24, 26 of at least two claws can be bent in different oblique angular directions with respect to the longitudinal axis of the elongate wiper strip 14 to lock the wiper strip 14 against longitudinal movement with respect to the yoke system 12 when additional holding force is desired. In the preferred configuration, the plurality of bent claws are disposed adjacent to one another allowing the remaining longitudinal length of the wiper strip 14 to expand and contract with respect to the remaining claws 22 left in the opened position 30 in order to allow the wiper strip 14 to follow the contour of the windshield to be cleaned.

The opposing sidewalls 24, 26 of at least one claw 22 of the yoke system 12 can be simultaneously bent with a pair of angularly reciprocal tapered rollers 36, 38 where one end 40 of each roller has an enlarged diameter and an opposite end 42 of each roller has a reduced diameter. At least one claw 22 of the yoke system 12 is oriented during assembly to be engagable with the pair of tapered rollers 36, 38 such that the reduced diameter end 42 of each roller is closer to a central portion of the yoke system 12 than the enlarged diameter end 40 of each roller 36, 38. Alternatively, at least one claw 22 of the yoke system 12 can be oriented during assembly to be engagable with the pair of tapered rollers 36, 38 such that the enlarged diameter end 40 of each roller is closer to a central portion of the yoke system 12 than the reduced diameter end 42 of each roller 36, 38. In the preferred configuration, the opposing sidewalls of at least one claw 22 are obliquely crimped with a dual axis force to deform the sidewalls 24, 26 in a direction other than perpendicular to the longitudinal axis of the elongate wiper strip 14.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A method of manufacturing a wiper blade for a windshield wiper system of motor vehicles with a yoke system for guiding an elongate wiper strip including a lip mounted on a carrier via a web, the method comprising the steps of:
    installing the wiper strip with respect to the yoke system with the carrier extending through at least one claw of the yoke system, each claw having opposing bendable sidewalls, each sidewall having an intermediate portion and an outer end, the opposing bendable sidewalls defining a generally U-shaped channel therebetween and initially in an opened position with respect to one another during installation of the wiper strip; and
    bending only the outer ends of the opposing sidewalls of at least one claw inwardly in two directions toward a longitudinal axis of the elongate wiper strip to a closed position while maintaining the intermediate portions of the opposing sidewalls parallel to one another, where one of the two directions of bending movement is at an angle other than perpendicular with respect to the longitudinal axis of the elongate wiper strip and the other of the two directions is at an angle other than parallel with respect to a base wall extending between the opposing sidewalls of the U-shaped channel in the yoke system.

2. A method of manufacturing a wiper blade for a windshield wiper system of motor vehicles with a yoke system for guiding an elongate wiper strip including a lip mounted on a carrier via a web, the method comprising the steps of:
    installing the wiper strip with respect to the yoke system with the carrier extending through at least one claw of the yoke system, each claw having opposing bendable sidewalls defining a generally U-shaped channel therebetween and initially in an opened position with respect to one another during installation of the wiper strip; and
    bending the opposing sidewalls of at least one claw inwardly in two directions toward a longitudinal axis of the elongate wiper strip to a closed position, where one of the two directions of bending movement is at an angle other than perpendicular with respect to the longitudinal axis of the elongate wiper strip and the other of the two directions is toward a base wall extending between the opposing sidewalls of the U-shaped channel in the yoke system, wherein the bending step includes the step of simultaneously bending the opposing sidewalls of at least one claw of the yoke system with a pair of angularly reciprocal tapered rollers, where one end of each roller has an enlarged diameter and an opposite end of each roller has a reduced diameter.

3. The method of claim 2 wherein the bending step further comprises the step of:
    bending the opposing sidewalls of a plurality of claws associated with the yoke system inwardly at an oblique angle with respect to the longitudinal axis of the elongate wiper strip.

4. The method of claim 2 wherein the bending step further comprises the step of:
    bending the opposing sidewalls of at least two claws in different oblique angular directions with respect to the longitudinal axis of the elongate wiper strip to lock the wiper strip against longitudinal movement with respect to the yoke system.

5. The method of claim 2 wherein the bending step further comprises the step of:
    orienting at least one claw of the yoke system to be engagable with the pair of tapered rollers such that the reduced diameter of each roller is closer to a central portion of the yoke system than the enlarged diameter of each roller.

6. The method of claim 2 wherein the bending step further comprises the step of:
    orienting at least one claw of the yoke system to be engagable with the pair of tapered rollers such that the enlarged diameter of each roller is closer to a central portion of the yoke system than the reduced diameter of each roller.

7. A wiper blade manufactured according to the method of claim 2 for windshield wiper systems of motor vehicles with a yoke system for guiding a wiper strip including a lip mounted on a carrier via a web, the wiper blade comprising:
    the wiper strip installed with respect to the yoke system with the carrier extending through at least one claw of the yoke system, each claw having opposing bendable sidewalls defining a generally U-shaped channel therebetween and initially in an opened position with respect to one another during installation of the wiper strip; and
    the opposing sidewalls of at least one claw extending inwardly in two directions toward a longitudinal axis of the elongate wiper strip to a closed position, where one of the two directions is at an angle other than perpendicular with respect to the longitudinal axis of the elongate wiper strip and the other of the two directions is at an angle other than parallel with respect to a base wall extending between the opposing sidewalls of the U-shaped channel in the yoke system.

8. The wiper blade of claim 7 further comprising:
    the opposing sidewalls of a plurality of claws associated with the yoke system extending inwardly at an oblique angle with respect to the longitudinal axis of the elongate wiper strip.

9. The wiper blade of claim 7 further comprising:
the opposing sidewalls of at least two claws extending in different oblique angular directions with respect to the longitudinal axis of the elongate wiper strip to lock the wiper strip against longitudinal movement with respect to the yoke system.

10. A method of manufacturing a wiper blade for a windshield wiper system of motor vehicles with a yoke system for guiding an elongate wiper strip including a lip mounted on a carrier via a web, the method comprising the steps of:
installing the wiper strip with respect to the yoke system with the carrier extending through at least one claw of the yoke system, each claw having opposing bendable sidewalls defining a generally U-shaped channel therebetween and initially in an opened position with respect to one another during installation of the wiper strip; and
bending the opposing sidewalls of at least one claw inwardly in two directions toward a longitudinal axis of the elongate wiper strip to a closed position, where one of the two directions of bending movement is at an angle other than perpendicular with respect to the longitudinal axis of the elongate wiper strip and the other of the two directions is toward a base wall extending between the opposing sidewalls of the U-shaped channel in the yoke system, wherein the bending step includes the step of obliquely crimping the opposing sidewalls of at least one claw with a dual axis force to deform the sidewalls in a direction other than perpendicular to the longitudinal axis of the elongate wiper strip.

11. A wiper blade for a windshield wiper system of motor vehicles with a yoke system for guiding an elongate wiper strip including a lip mounted on a carrier via a web, the wiper blade manufactured according to a method comprising the steps of installing the wiper strip with respect to the yoke system with the carrier extending through at least one claw of the yoke system, each claw having opposing bendable sidewalls, each sidewall having an intermediate portion and an outer end, the opposing bendable sidewalls defining a generally U-shaped channel therebetween and initially in an opened position with respect to one another during installation of the wiper strip, and bending only the outer ends of the opposing sidewalls of at least one claw inwardly in two directions toward a longitudinal axis of the elongate wiper strip to a closed position, where one of the two directions of bending movement is at an angle other than perpendicular with respect to the longitudinal axis of the elongate wiper strip and the other of the two directions is at an angle other than parallel with respect to a base wall extending between the opposing sidewalls of the U-shaped channel in the yoke system, the wiper blade comprising:
the wiper strip installed with respect to the yoke system with the carrier extending through at least one claw of the yoke system, each claw having opposing bendable sidewalls, each sidewall having an intermediate portion and an outer end, the opposing bendable sidewalls defining a generally U-shaped channel therebetween and initially in an opened position with respect to one another during installation of the wiper strip; and
the outer ends of the opposing sidewalls of at least one claw extending inwardly in two directions toward a longitudinal axis of the elongate wiper strip to a closed position, where one of the two directions is at an angle other than perpendicular with respect to the longitudinal axis of the elongate wiper strip and the other of the two directions is at an angle other than parallel with respect to a base wall extending between the opposing sidewalls of the U-shaped channel in the yoke system, the opposing sidewalls of at least one claw of the yoke system having only the outer ends angled inwardly toward the base wall and angled inwardly toward the longitudinal axis of the elongate wiper strip, where each respective outer end forms an acute angle with respect to the adjoining intermediate portion further wherein the intermediate portions of the opposing sidewalls are parallel to one another.

12. A wiper blade for a windshield wiper system of motor vehicles with a yoke system for guiding an elongate wiper strip including a lip mounted on a carrier via a web, the wiper blade manufactured according to a method comprising the steps of installing the wiper strip with respect to the yoke system with the carrier extending through at least one claw of the yoke system, each claw having opposing bendable sidewalls, each sidewall having an intermediate portion and an outer end, the opposing bendable sidewalls defining a generally U-shaped channel therebetween and initially in an opened position with respect to one another during installation of the wiper strip, and bending only the outer ends of the opposing sidewalls of at least one claw inwardly in two directions toward a longitudinal axis of the elongate wiper strip to a closed position, where one of the two directions of bending movement is at an angle other than perpendicular with respect to the longitudinal axis of the elongate wiper strip and the other of the two directions is at an angle other than parallel with respect to a base wall extending between the opposing sidewalls of the U-shaped channel in the yoke system, the wiper blade comprising:
the wiper strip installed with respect to the yoke system with the carrier extending through at least one claw of the yoke system, each claw having opposing bendable sidewalls, each sidewall having an intermediate portion and an outer end, the opposing bendable sidewalls defining a generally U-shaped channel therebetween and initially in an opened position with respect to one another during installation of the wiper strip; and
the outer ends of the opposing sidewalls of at least one claw extending inwardly in two directions toward a longitudinal axis of the elongate wiper strip to a closed position, where one of the two directions is at an angle other than perpendicular with respect to the longitudinal axis of the elongate wiper strip and the other of the two directions is at an angle other than parallel with respect to a base wall extending between the opposing sidewalls of the U-shaped channel in the yoke system, only the outer ends of at least one claw obliquely extending in a direction other than perpendicular to the longitudinal axis of the elongate wiper strip further wherein the intermediate portions of the opposing sidewalls are parallel to one another.

13. A wiper blade for windshield wiper systems of motor vehicles with a yoke system for guiding a wiper strip including a lip mounted on a carrier via a web, the wiper blade comprising:
the wiper strip extending through at least one claw of the yoke system, each claw having opposing sidewalls, each sidewall having an intermediate portion and an outer end, the opposing bendable sidewalls defining a generally U-shaped channel therebetween wherein the intermediate portions of the opposing sidewalls are parallel to one another only; and the opposing sidewalls of at least one claw extending inwardly in two directions toward a longitudinal axis of the wiper strip, one of the two directions of sidewall extension being at an angle other than perpendicular with respect to the longitudinal axis of the elongate wiper strip and the other of the two directions being at an angle other than parallel with respect to a base wall extending between the opposing sidewalls of the U-shaped channel in the yoke system.

14. The wiper blade of claim 13 further comprising:
the opposing sidewalls of a plurality of claws associated with the yoke system extending inwardly at an oblique angle with respect to the longitudinal axis of the elongate wiper strip.

15. The wiper blade of claim 13 further comprising:
the opposing sidewalls of at least two claws extending in different oblique angular directions with respect to the longitudinal axis of the elongate wiper strip to lock the wiper strip against longitudinal movement with respect to the yoke system.

16. The wiper blade of claim 13 further comprising:
the opposing sidewalls of at least one claw obliquely extending in a direction other than perpendicular to the longitudinal axis of the elongate wiper strip.

17. The wiper blade of claim 13 further comprising:
the opposing sidewalls having outer end walls angled inwardly toward one another at one longitudinal end.

18. The wiper blade of claim 13 further comprising:
the opposing sidewalls having inwardly extending portions with end surfaces facing toward a base wall extending between the opposing sidewalls of the U-shaped channel of the yoke system.

19. The wiper blade of claim 13 further comprising:
the opposing sidewalls having outer end walls angled inwardly toward one another at one longitudinal end, and the opposing sidewalls having inwardly extending portions with end surfaces facing toward a base wall extending between the opposing sidewalls of the U-shaped channel of the yoke system.

20. The wiper blade of claim 13 further comprising:
the opposing sidewalls of at least one claw of the yoke system having outer ends angled inwardly toward the base wall and angled inwardly toward the longitudinal axis of the elongate wiper strip, where each respective outer end forms an acute angle with respect to the adjoining intermediate portion.

21. The wiper blade of claim 13 further comprising:
the opposing outer end walls of at least one claw obliquely extending in a direction other than perpendicular to the longitudinal axis of the elongate wiper strip and obliquely extending in a direction other than parallel to the base wall.

* * * * *